(12) United States Patent
Diani et al.

(10) Patent No.: US 8,677,847 B2
(45) Date of Patent: Mar. 25, 2014

(54) 7-SPEED TRANSMISSION

(75) Inventors: Roberto Diani, Modena (IT); Paolo Neri, Campogalliano (IT); Fabio Belletti, Malalbergo (IT)

(73) Assignee: Automobili Lamborghini S.p.A., Sant' Agata Bolognese (IT)

( * ) Notice: Subject to any disclaimer, the term of this patent is extended or adjusted under 35 U.S.C. 154(b) by 0 days.

(21) Appl. No.: 13/817,390

(22) PCT Filed: Aug. 17, 2011

(86) PCT No.: PCT/IB2011/053632
§ 371 (c)(1),
(2), (4) Date: Feb. 27, 2013

(87) PCT Pub. No.: WO2012/023109
PCT Pub. Date: Feb. 23, 2012

(65) Prior Publication Data
US 2013/0233104 A1   Sep. 12, 2013

(30) Foreign Application Priority Data
Aug. 17, 2010   (IT) .............................. MI2010A1556

(51) Int. Cl.
*F16H 3/089* (2006.01)
(52) U.S. Cl.
USPC .................................. 74/373; 74/359; 74/366
(58) Field of Classification Search
USPC ..................... 74/325, 342, 373, 329
See application file for complete search history.

(56) References Cited

U.S. PATENT DOCUMENTS

| | | | | |
|---|---|---|---|---|
| 1,641,253 | A | * | 9/1927 | Donon ............................ 74/342 |
| 2,953,943 | A | * | 9/1960 | Arnold ............................ 74/745 |
| 4,041,791 | A | * | 8/1977 | Coy ................................ 74/325 |
| 4,282,775 | A | * | 8/1981 | Van Dest ....................... 475/140 |
| 5,404,772 | A | * | 4/1995 | Jester .......................... 74/606 R |
| 5,445,042 | A | * | 8/1995 | Deady ............................ 74/329 |
| 5,704,866 | A | * | 1/1998 | Pritchard et al. .............. 475/206 |

(Continued)

FOREIGN PATENT DOCUMENTS

| | | |
|---|---|---|
| DE | 102006016059 | 10/2007 |
| DE | 102008005930 | 8/2008 |

(Continued)

OTHER PUBLICATIONS

International Search Report issued by the European Patent Office in International Application No. PCT/IB2011/053632.

*Primary Examiner* — Troy Chambers
*Assistant Examiner* — Valentin Craciun
(74) *Attorney, Agent, or Firm* — Henry M. Feiereisen LLC

(57) ABSTRACT

A 7-speed transmission for a motor vehicle, in particular for a sports car, includes an input or primary shaft, an output or secondary shaft, a first, a second, a third, a fourth, a fifth, a sixth and a seventh forward speed, as well as a reverse speed. In order to obtain a compact constructional design with a small transversal size and allow a sporty drive mode in the upshift from the first to the sixth speed, in which the shift process occur in an overlapping manner and almost without any interruption of the drive force, the eight speeds are combined in pairs into four shift groups, two of the four shift groups are arranged on the input or primary shaft and two on the output or secondary shaft, respectively, and at least between the first speed and the sixth speed adjacent speeds are arranged in different shift groups.

24 Claims, 4 Drawing Sheets

(56) References Cited

U.S. PATENT DOCUMENTS

| | | | |
|---|---|---|---|
| 7,243,565 B2* | 7/2007 | Soeda | 74/329 |
| 7,500,411 B2* | 3/2009 | Gumpoltsberger | 74/329 |
| 7,757,577 B2 | 7/2010 | Kawamoto et al. | |
| 2002/0014130 A1* | 2/2002 | Ogami et al. | 74/335 |
| 2003/0084738 A1* | 5/2003 | Ishihara et al. | 74/329 |
| 2004/0093972 A1* | 5/2004 | Gumpoltsberger et al. | 74/325 |
| 2005/0061093 A1* | 3/2005 | Tsberger | 74/329 |
| 2005/0085328 A1* | 4/2005 | Yamada | 475/198 |
| 2005/0103140 A1* | 5/2005 | Gumpoltsberger | 74/329 |
| 2005/0150318 A1* | 7/2005 | Baldascini et al. | 74/331 |
| 2006/0150761 A1* | 7/2006 | Beer et al. | 74/335 |
| 2007/0022835 A1* | 2/2007 | Kilian et al. | 74/340 |
| 2007/0137335 A1* | 6/2007 | Lee | 74/329 |
| 2008/0053258 A1* | 3/2008 | Ohnemus | 74/329 |
| 2008/0134817 A1 | 6/2008 | Bjorck et al. | |
| 2008/0178696 A1 | 7/2008 | Diemer et al. | |
| 2009/0173175 A1* | 7/2009 | Thery | 74/331 |
| 2013/0019705 A1* | 1/2013 | Pregnolato et al. | 74/331 |

FOREIGN PATENT DOCUMENTS

| | | |
|---|---|---|
| DE | 102007039980 | 2/2009 |
| EP | 1 580 456 | 9/2005 |
| JP | 57-110348 | 7/1982 |
| JP | 2001-124198 | 5/2001 |
| JP | 2007-315444 | 12/2007 |
| JP | 2008-542663 | 11/2008 |
| JP | 2009-523972 | 6/2009 |
| WO | WO 2007/082572 | 7/2007 |

* cited by examiner

7-SPEED TRANSMISSION

CROSS-REFERENCES TO RELATED APPLICATIONS

This application is the U.S. National Stage of International Application No. PCT/IB2011/053632, filed Aug. 17, 2011, which designated the United States and has been published as International Publication No. WO 2012/023109 and which claims the priority of Italian Patent Application, Serial No. MI2010A001556, filed Aug. 17, 2010, pursuant to 35 U.S.C. 119(a)-(d).

BACKGROUND OF THE INVENTION

The invention relates to a 7-speed transmission for a motor vehicle, and in particular to an automated 7-speed transmission in which the engagement and the disengagement of the speeds are carried out electro-hydraulically.

A transmission of this kind is disclosed for example in DE 10 2006 016 059 B4.

SUMMARY OF THE INVENTION

There are often two needs when transmissions of this kind are mounted on sports car: on the one hand the transmission, due to the limited available space, should have a relatively small constructional size. In particular, when the transmission is arranged in a two-seater sports car, in the forward direction, in front of a drive engine inserted in the tail of the sports car within a central tunnel extending forward between the seats of the sports car, the transversal size of the transmission should not be too big. On the other hand, during the upshift from the first to the sixth forward speed for the sporty drive, the disengagement of the already engaged speed and the engagement of the immediately higher speed should occur at the same time or with a certain overlap so that the speed change can be completed in a very fast way.

Starting from this, the problem at the base of the invention is to improve a transmission of the above mentioned prior art so that a compact constructional design with small transversal dimensions and a sporty drive mode in the upshift from the first to the sixth speed are made possible, in which the shift process occur in an overlapping manner and almost without any interruption of the drive force.

This problem is solved according to the invention so that the eight speeds are combined in pairs into four shift groups, that two of the four shift groups are arranged on the input or primary shaft and on the output or secondary shaft, respectively, and that at least between the first speed and the sixth speed adjacent speeds are arranged in different shift groups.

Within the frame of this patent application two speeds which are shifted by means of a common shift device are defined as a shift group, for which purpose its pairs of gears are arranged in a side-by-side position. Since two speeds share each a common shift device, the need of space of the transmission can be remarkably reduced. By means of the arrangement of all the eight speeds, i.e. of the seven forward speeds and of the reverse speed, on only two shafts, namely the input or primary shaft and the output or secondary shaft, especially the transversal dimensions of the transmission can be kept very small. Also the distribution in pairs of the four shift groups on the two shafts helps in minimizing the need of space of the shift devices needed for the shift, such as for example shift bars. On the other hand, by means of the arrangement of adjacent speeds into different shift groups, the shift devices of adjacent speeds can be driven at the same time or with a time intersection, since both shift processes, i.e. the disengagement of the already engaged speed and the engagement of the closest higher speed or the closest lower speed, due to the arrangement of the adjacent speeds into different shift groups are carried out with different shift devices which can be controlled separately. Thus, the speed change can be completed in a very fast manner and almost without any interruption of the driving force, which makes a very sporty drive mode possible between the first and the sixth speed.

In order to make it possible, with a need of space as low as possible, that in two shift groups adjacent speeds are arranged in different shift groups on the input or primary shaft and on the output or secondary shaft, respectively, a preferential embodiment of the invention provides that a first shift group comprises the reverse speed and the first speed, a second shift group comprises the second speed and the fourth speed, a third shift group comprises the third speed and the fifth speed, and a fourth shift group comprises the sixth speed and the seventh speed.

In this regard, the first and second shift groups are advantageously arranged on the output or secondary shaft, suitably on the half of the output or secondary shaft opposite to a drive engine of the motor vehicle, while the third and the fourth shift groups are arranged on the input or primary shaft, suitably on the other half, adjacent to the drive engine, of the input or primary shaft.

The sequence of the shift groups is advantageously chosen so that the second shift group is arranged on the engine side with respect to the first shift group on the output or secondary shaft, while the third shift group is arranged on the engine side with respect to the fourth shift group on the input or primary shaft.

A particularly compact and at the same time short constructional design of the transmission is obtained by means of the fact that each of the eight speeds comprises a driving gear and a driven gear, of which one is arranged on the input or primary shaft and the other is arranged on the output or secondary shaft, wherein one of the two gears of each speed is mounted as a fixed gear and the other is mounted as an idle gear, respectively, on the respective shaft, and wherein the idle gear for driving a shift device of the correspondent shift group can be coupled in a rotationally restrained manner with the corresponding shaft.

Advantageously, the driving gears of the reverse speed and of the first speed are mounted in a rotationally restrained manner as fixed gears on the input or primary shaft, while the driven gears of the reverse speed and of the first speed are mounted in a rotationally free manner as idle gears on the output or secondary shaft so that, in the reverse speed or in the first speed, respectively, one of these two driven idle gears can be connected at choice, by means of a shift device of the first shift group, in a rotationally restrained manner with the output or secondary shaft. A corresponding consideration is advantageously valid also for the second speed and the fourth speed, in which the driving gears are also suitably mounted as fixed gears on the input or primary shaft. Correspondingly, the driven gears are mounted as idle gears in a rotationally free manner on the output or secondary shaft, wherein one of these driven idle gears can be coupled at choice by means of a shift device of the second shift group in a rotationally restrained manner with the output or secondary shaft.

On the contrary, in the third, fifth, sixth and seventh speed the driven gears are advantageously mounted as fixed gears on the output or secondary shaft, while the driving gears are mounted as idle gears on the input or primary shaft. In this case, one of the two idle driving gears of the third speed and of the fifth speed can be connected at choice by means of a shift device of the third shift group, in a rotationally restrained manner, with the input or primary shaft, while one of the two idle driving gears of the sixth and of the seventh speed can be connected at choice by means of a shift device of the fourth shift group, in a rotationally restrained manner, with the input or primary shaft.

The transmission is suitably a shift sleeve transmission, in which the idle gears on the corresponding shaft are only rotatable, but they are not slidable in the axial direction, and in which the idle gears with the aid of shift devices in the form of shift sleeves are connected in a rotationally restrained manner with the corresponding shaft. In this regard, each shift group has a single shift sleeve, with which one of the two idle gears of the two speeds belonging to the shift group can be driven at choice, i.e. it can be engaged or disengaged.

For reversing the run direction in the reverse speed, the latter advantageously comprises a third gear which is arranged between the driving gear mounted on the input or primary shaft and the driven gear mounted on the output or secondary shaft.

The drive of the two front wheels of the motor vehicle is preferably carried out through a drive shift leading from the gearbox to a front axle differential, the rear end of the drive shaft being connected in a rotationally restrained manner with the front end of the output or secondary shaft. On the other hand, the drive of the two rear wheels of the motor vehicle is preferably carried out through a drive shaft lead from the gearbox under the drive engine up to a rear axle differential, the front end of the drive shaft being connected in a rotationally restrained manner with the rear end of a short tertiary shaft driven by the output or secondary shaft. The tertiary shaft preferably carries a single gear which is in mesh with the driven gear of a third speed on the output or secondary shaft.

In order to increase the rigidity of the system and to improve the stability during the working, both the input or primary shaft and the output or secondary shaft are each supported in three journal bearings, which are arranged close to a center and to two opposite front ends of the shafts. In order to make the installation of the central journal bearings easier, the gear box is suitably divided along a central dividing plane thereof into two casing parts arranged one behind the other in the axial direction.

The transmission is preferably an automatic transmission, the speeds of which are engaged in an electro-hydraulic way, preferably through four axially movable shift bars, each of which is firmly connected with the shift sleeve of one of the four shift groups and can be shifted inside the gearbox parallel to the rotation axes of the input or primary shaft and the output or secondary shaft with the aid of two hydraulic cylinders at the two opposite front ends of the shift bar. The hydraulic shifting of the shift bars is carried out with the aid of a hydraulic group, which is suitably flanged at the front end of the transmission opposite to the drive engine outside the gearbox and which is connected through hydraulic ducts with the hydraulic cylinders.

BRIEF DESCRIPTION OF THE DRAWING

The present invention is disclosed hereafter more in detail with reference to an exemplary embodiment shown in the drawing.

DETAILED DESCRIPTION OF PREFERRED EMBODIMENTS

Figure 1:
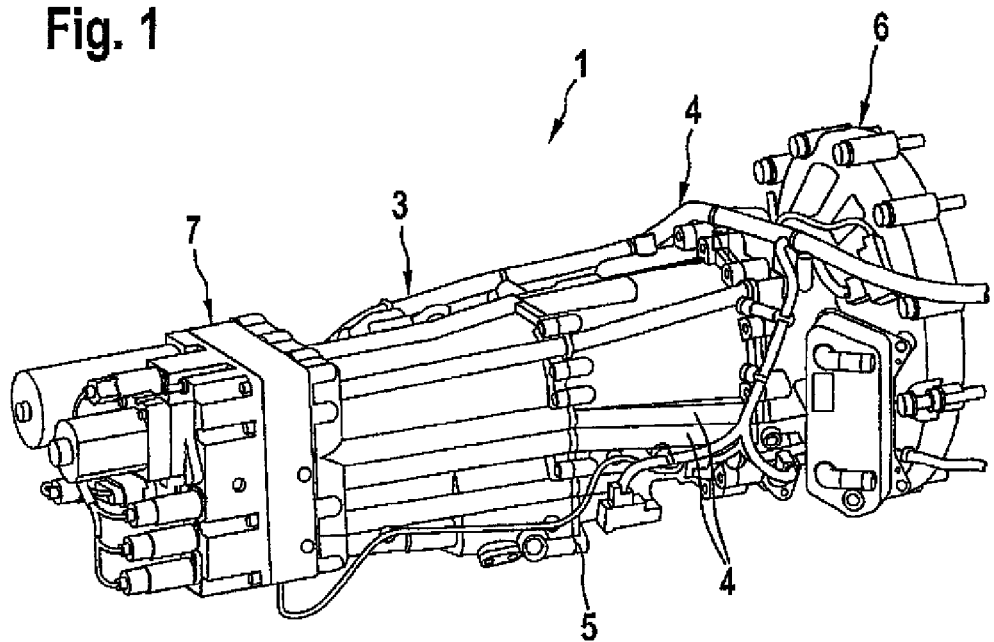
FIG. 1 shows a perspective view of a transmission according to the invention constructed as a shift sleeve transmission.

The 7-speed transmission 1 illustrated in the drawing for a two-seater sports car is intended to be installed, in the forward direction, in front of a drive engine (not shown) inserted in the tail of the sports car, so that transmission 1 after the installation is arranged inside a central tunnel T (FIG. 5) of the sports car, which tunnel extends forwards through the driver and passenger compartment between the seats.

Transmission 1 has a gearbox 2 divided into two parts in the forward direction of the motor vehicle with a front casing part 3 and a rear casing part 4, which are mutually connected in a separable manner along a dividing plane 5. The rear casing part 4 is provided at its front end facing the drive engine with a flanged clutch 6 constructed as a dual disk clutch, while the front casing portion 3 at its front end opposite to the drive engine is provided with a hydraulic group 7 of an electro-hydraulic gear shift.

Figure 2:
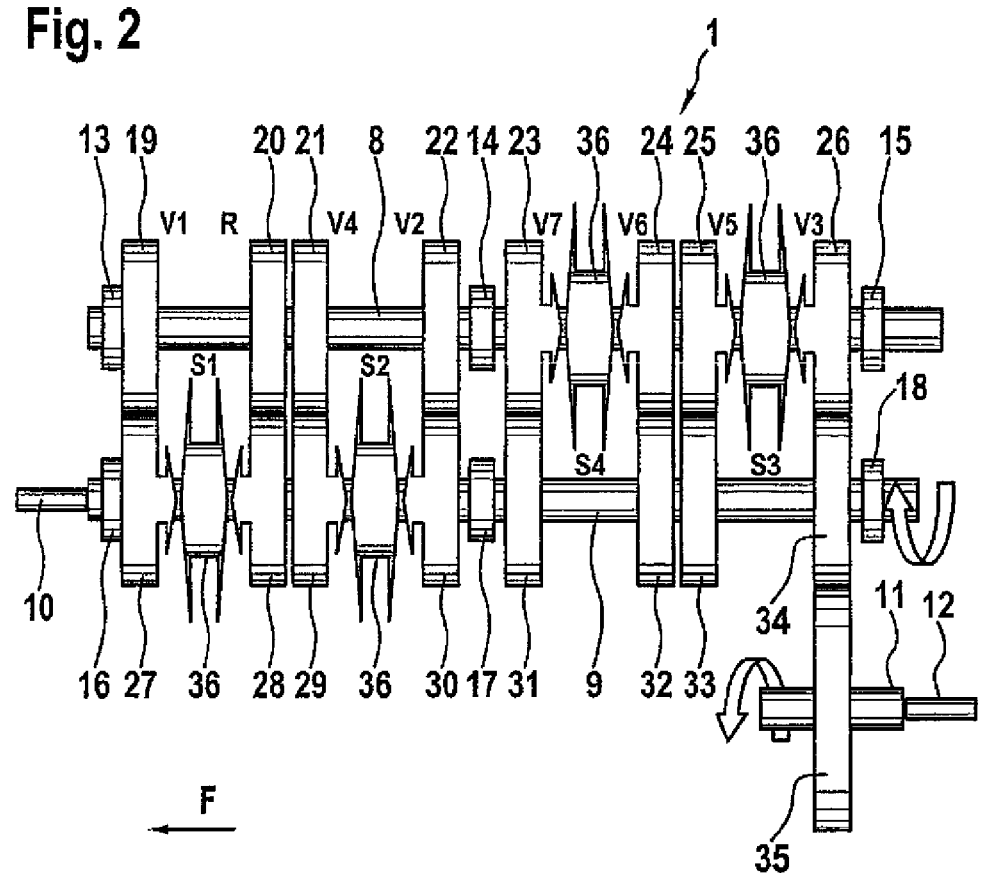
FIG. 2 shows a schematic view of shafts, gears and shift sleeves of the transmission.
Figure 3:
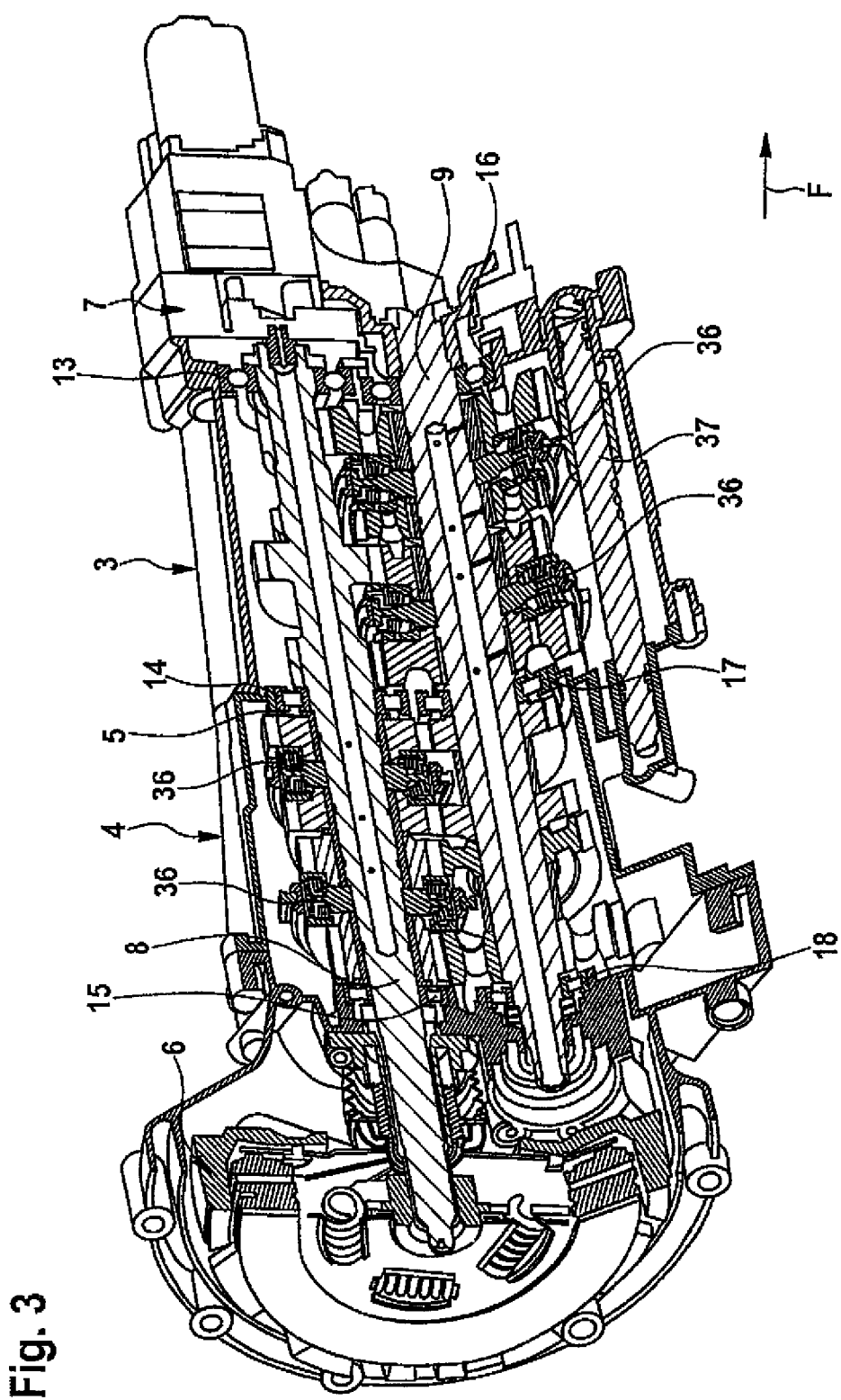
FIG. 3 shows a partially cutaway perspective view of the transmission, however from a point of view opposite to FIG. 1.
Figure 5:
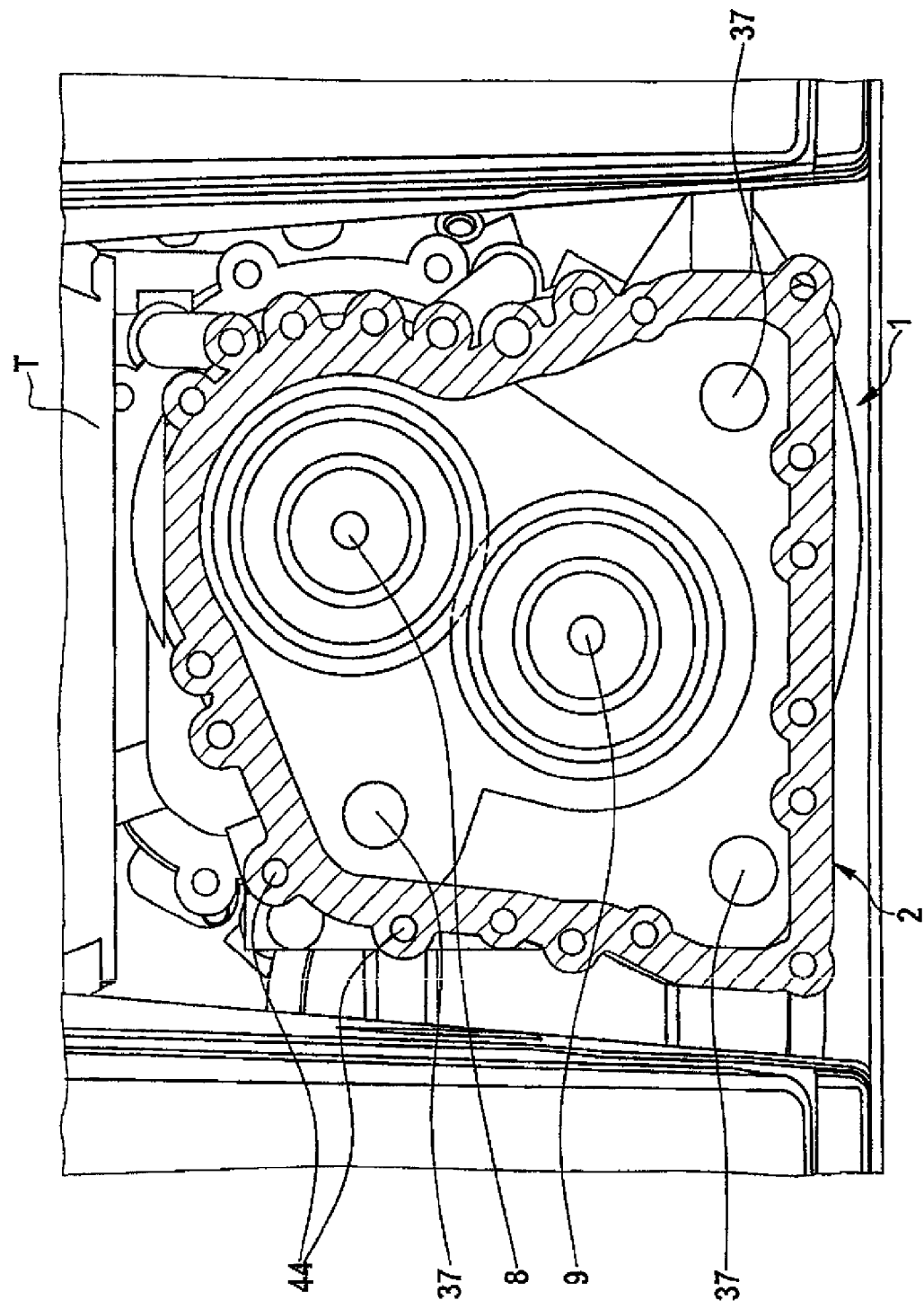
FIG. 5 shows a cross-sectioned view of the transmission.

As shown in the best way in FIGS. 2 and 3, two shafts extending substantially on the whole length of transmission 1 are arranged inside gearbox 2, namely an input or primary shaft 8 driven by the drive engine through clutch 6 and an output or secondary shaft 9 parallel to the input or primary shaft 8, the front front end of which, with respect to the forward direction, is connected in a rotationally restrained manner with a drive shaft 10 leading to a front axle or to a front axle differential of the motor vehicle, as it is schematically shown in FIG. 2. Furthermore, transmission 1 on the side of the drive engine is provided with a short second output shaft or tertiary shaft 11 which is driven by shaft 9 and the rear front end of which is connected in a rotationally restrained manner with a drive shaft 12 leading under the drive engine to a rear axle or to a rear axle differential of the motor vehicle, as it is schematically shown in FIG. 2. In order to let drive shaft 12 pass under the drive engine, on the one hand the output or secondary shaft 9 is arranged aslant under the input or primary shaft 8, as shown in FIG. 5. On the other hand, also the second output shaft or tertiary shaft 11 is arranged aslant under the output or secondary shaft 9.

As shown in the best way in FIGS. 2 and 3, the input or primary shaft 8 and the output or secondary shaft 9 are each supported in three journal bearings, 13, 14, 15 or 16, 17, 18, respectively, of gearbox 2, of which two, 13, 15 or 17, 18, respectively, are arranged at the two opposite front ends of gearbox 2 and the third, 14 or 17, respectively, is arranged contiguous to the dividing plane 5, in the rear casing part 4 adjacent to the drive engine.

Transmission 1 is a synchronized transmission in which the input or primary shaft 8 carries eight driving gears 19, 20, 21, 22, 23, 24, 25, 26, each of them being in a permanent mesh with one of eight driven gears 27, 28, 29, 30, 31, 32, 33, 34 on the output or secondary shaft 9.

Gears 19, 20, 21, 22, 23, 24, 25, 26 and 27, 28, 29, 30, 31, 32, 33, 34 are each cylindrical cogwheels, which are provided in pairs with a straight or slanted complementary toothing. Each pair of gears 19, 27; 20, 28; 21, 29; 22, 30; 23, 31; 24, 32; 25, 33; 26, 34 on the input or primary shaft 8 and on the output or secondary shaft 9 is associated to one of the eight speeds of transmission 1. These eight speeds comprise seven forward speeds V1, V2, V3, V4, V5, V6, V7 and one reverse speed R, the arrangement of which along the two shafts 8, 9 is indicated in FIG. 2 above gears 19, 20, 21, 22, 23, 24, 25, 26. As shown in FIG. 2, speeds V1, V2, V3, V4, V5, V6, V7 and R, namely their pairs of gears 19, 27; 22, 30; 26, 34; 21, 29; 25, 33; 24, 32; 23, 31 and 20, 28 are arranged, starting from the front ends of shafts 8, 9 opposite to the drive engine, in the following sequence: first speed V1 with the two gears 19 and 27, reverse speed R with the two gears 20 and 28, fourth speed V4 with the two gears 21 and 29, second speed V2 with the two gears 22 and 30, seventh speed V7 with the two gears 23 and 31, sixth speed V6 with the two gears 24 and 32, fifth speed V5 with the two gears 25 and 33, as well as third speed V3 with the two gears 26 and 34.

All the gears 19, 20, 21, 22, 23, 24, 25, 26, and 27, 28, 29, 30, 31, 32, 33, 34 are applied in a non slidable manner on the relevant shaft 8 or 9, respectively. One of the two gears 19, 20, 21, 22, 31, 32, 33, 34 of each pair of gears 19, 27; 20, 28; 21, 29; 22, 30; 23, 31; 24, 32; 25, 33; 26, 34 is mounted in a rotationally restrained manner as a fixed gear on the relevant shaft 8 or 9, respectively, while the other of the two gears 27, 28, 29, 30, 23, 24, 25, 26 of the each pair of gears 19, 27; 20, 28; 21, 29; 22, 30; 23, 31; 24, 32; 25, 33; 26, 34 is inserted in a rotationally free manner as an idle gear on the relevant shaft 9 or 8, respectively, and can be coupled in a rotationally restrained manner with shaft 9 or 8, respectively.

Among the eight driving gears 19, 20, 21, 22, 23, 24, 25, 26 mounted on the input or primary shaft 8, four are constructed as fixed gears and four as idle gears. The fixed gears are gears 19, 20, 21, 22 of the first speed V1, the reverse speed R, the fourth speed V4 and the second speed V2, which are arranged in FIG. 2 from left to right one beside the other on the half of the input or primary shaft 8 opposite to the drive engine. The idle gears are gears 23, 24, 25, 26 of the seven speed V7, the sixth speed V6, the fifth speed V5 and the third speed V3, which are arranged in FIG. 2 from left to right one beside the other on the half of the input or primary shaft 8 adjacent to the drive engine.

Among the eight driven gears 27, 28, 29, 30, 31, 32, 33, 34 mounted on the output or secondary shaft 9, gears 27, 28, 29, 30 of the first speed V1, the reverse speed R, the fourth speed V4 and the second speed V2 are mounted from left to right in FIG. 2 as idle gears on the half of shaft 9 opposite to the drive engine, while gears 31, 32, 33, 45 of the seventh speed V7, the sixth speed V6, the fifth speed V5 and the third speed V3 are mounted as fixed gears on the half or shaft 9 adjacent to the drive engine.

Gear 34, constructed as a fixed gear, of the third speed V3 is in a permanent mesh with a further gear 35 which is mounted as a fixed gear in a rotationally restrained manner on the second output shaft or tertiary shaft 11 which does not carry any further gear other than gear 35. Thus, the fixed gear 34 on the output or secondary shaft 9 can perform at the same time two function since on the one hand it forms together with the idle gear 26 on the input or primary shaft the gear stage for the third speed V3 and on the other hand it forms together with the fixed gear 35 on the second output shaft or tertiary shaft 11 the gear stage for driving the drive shaft 12. With this arrangement, i.e. with the two fixed gears 34, 35 on shafts 9 and 11, the drive shafts 10 and 12 in all the seven forward speeds from V1 to V7 and in the reverse gear are driven together. Furthermore, with this arrangement a separate gear stage or at least one gear for driving the drive shaft 12 can be saved.

In order to drive the two drive shafts 10 and 12 with the same number of revolutions, the two fixed gears 34 and 35 have the same diameter and the same number of teeth, so that a transmission ratio equal to 1 is provided between these gears 34 and 35.

The eight speeds V1, V2, V3, V4, V5, V6, V7 and R are combined in pairs into four shift groups S1, S2, S3, S4, wherein a first shift group S1 comprises the reverse speed R and the first speed V1, a second shift group S2 comprises the second speed V2 and the fourth speed V4, a third shift group S3 comprises the third speed V3 and the fifth speed V5, and a fourth shift group S4 comprises the sixth speed V6 and the seventh speed V7.

Speeds V1, R; V2, V4; V3, V5 and V6, V7 combined in pairs into a shift group S1, S2, S3, S4 are each shifted by means of a common shift device of the electro-hydraulic gear shift. The common shift device of each shift group S1, S2, S3, S4 comprises a shift sleeve 36 arranged between the adjacent idle gears of the two speeds V1, R; V2, V4; V3, V5 and V6, V7 and a shift bar 37 serving to control the shift sleeve 36. The shift sleeves 36 of the first and second shift groups S1 and S2 are arranged on the output or secondary shaft 9 between the two idle gears 28, 27 of the reverse gear R and the first speed V1 and between the two idle gears 30, 29 of the second speed V2 and the fourth speed V4, respectively, while the shift sleeves 36 of the third and fourth shift group S3 and S4 are arranged on the input or primary shaft 8 between the two idle gears 26, 25 of the third speed V3 and the fifth speed V5 and between the two idle gears 24, 23 of the sixth speed V6 and the seventh speed V7, respectively, as shown in FIG. 2.

Figure 4:
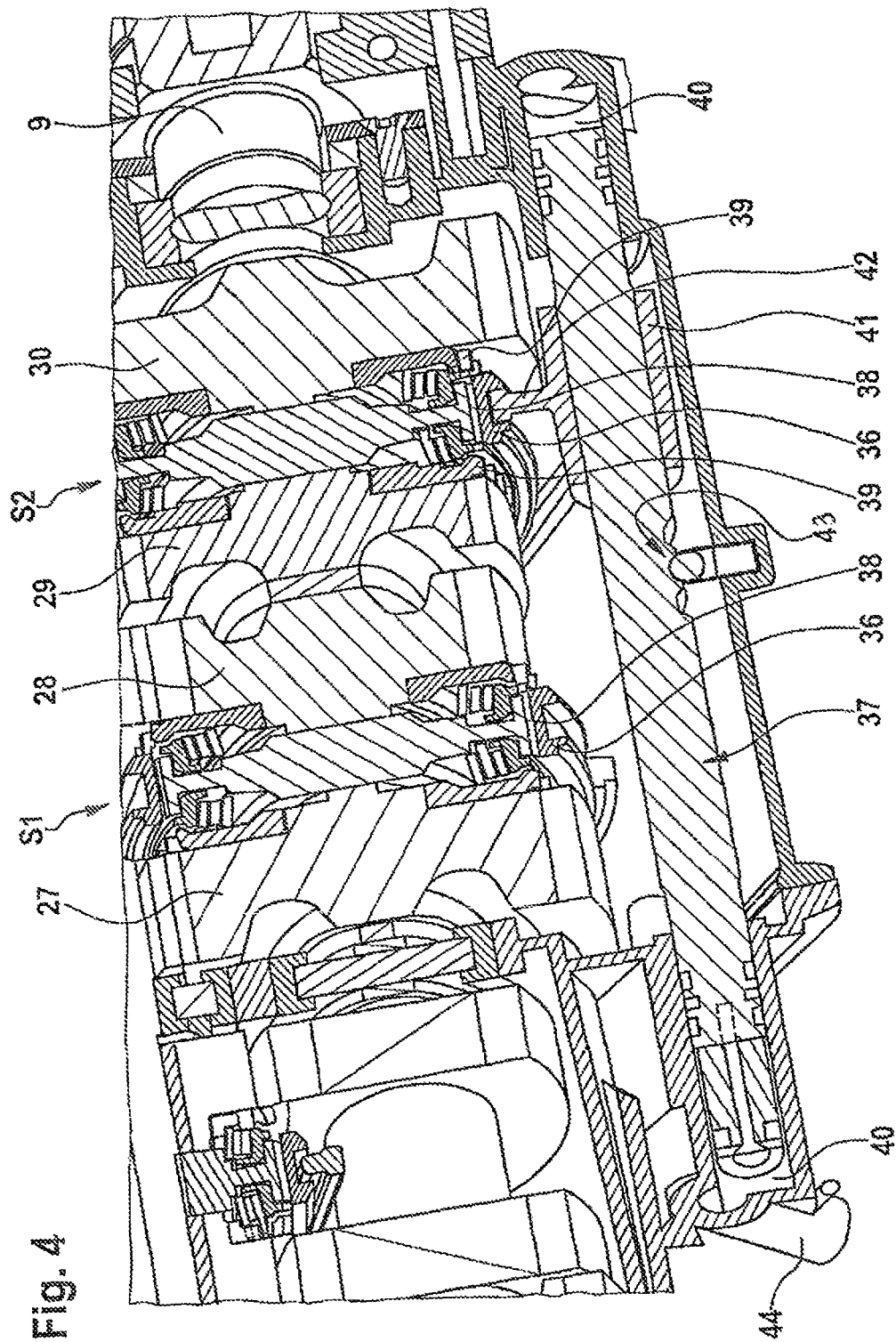
FIG. 4 shows an enlarged detailed view of a particular of FIG. 3.

As shown in the best way in FIG. 4, considering for example the shift group S1 on the output or secondary shaft 9, the shift sleeve 36 of each shift group is connected through a toothing 38 with shaft 9 so that the shift sleeve 36 with respect to shaft 9 is rotationally restrained and slidable in the axial direction. In a central rest position of the shift sleeve 36, neither idle gear 29, 30 of the two adjacent speeds V4 and V2 is coupled with shaft 9. In order to couple the idle gear 29, 30 of one of speeds V4, V2 in a rotationally restrained manner with shaft 9, the shift sleeve 36 is shifted toward the idle gear 29, 30 in one of the two opposite shift positions in which toothing 38 of the shift sleeve 36 engages with a complementary toothing 39 of the idle gear 29 or 30, respectively, and thus it connects the idle gear 29 or 30, respectively, in a rotationally restrained manner with shaft 9. When the shift sleeve 36 is shifted, a synchronizing device provides for the synchronization of the movement in synchrony between the shift sleeve 36 and the idle gear 29 or 30. The shift sleeves 36 close to the corresponding synchronizing device have a structure already known and therefore they do not need to be disclosed more in detail.

The shifting of each shift sleeve 36 is carried out with the aid of the relevant shift bar 37, one of which is shown in FIG. 4 and three are shown in FIG. 5. As shown in an exemplificative way in FIG. 4, the opposite front ends of each shift bar 37 are each guided in an axially slidable manner in a hydraulic cylinder 40 formed by the gearbox 2, so that the shift bar 37 by applying hydraulic oil to one of the hydraulic cylinders 40, oil which comes from the hydraulic group 7, can be shifted in opposite directions. A collar 41 having a protrusion 42 projecting toward the shift sleeve 36 and in engagement with the shift sleeve 36 so that the shift sleeve 36 is moved together with the shift bar 37 is fastened to the shift bar 37. In order to keep the shift sleeve 36 firm with respect to gearbox 2 in the rest position and in the two shift positions, gearbox 2 has a stop device 43 embodied as a spherical stop which is these positions engages with the shift bar 37.

The hydraulic cylinders 40 are connected with the hydraulic group 7 by means of hydraulic ducts 44, which hydraulic group is connected through signal lines (not shown) with a shift sectors guide of a gear shift lever or gearbox lever and which hydraulically converts electric shift signals received through the signal lines into corresponding movements of the shift bars 37.

As it can be seen from FIG. 2, with the exception of the fourth shift group S4 for the sixth and seventh speeds V6 and V7, two speeds V1, R; V2, V4; V3, V5 which do not follow each other in an immediate way but are instead separated by at least one speed are associated to each of the three remaining shift groups S1, S2 and S3. Thus, for example, in the upshift from the second speed V2 to the third speed V3, the shift bar 37 of the second shift group S2 serving for the disengagement of the second speed V2 can be moved simultaneously or in overlap with the engagement of the shift bar 37 of the third shift group S3 serving for the engagement of the third speed V3. This allows an almost uninterrupted shift of the drive force between the first speed V1 and the sixth speed V6, which means between speeds V1, V2, V3, V4, V5 and V6 in which a sporty drive is desired. On the other hand, this is no more necessary in the shift from the sixth speed V6 to the seventh speed V7, since the seventh speed V7 has to be rather considered as a long overdrive. Thus, with only four shift groups S1, S2, S3 and S4 an ideal combination of sports transmission 1 with a long overdrive is obtained.

LIST OF THE REFERENCE NUMBERS

1 Transmission
2 Gearbox
3 Front gear casing
4 Rear gear casing
5 Dividing plane
6 Clutch
7 Hydraulic group
8 Input or primary shaft
9 Output or secondary shaft
10 Drive shaft front axle
11 Second output shaft or tertiary shaft
12 Drive shaft rear axle
13 Journal bearing
14 Journal bearing
15 Journal bearing
16 Journal bearing
17 Journal bearing
18 Journal bearing
19 Fixed driving gear
20 Fixed driving gear
21 Fixed driving gear
22 Fixed driving gear
23 Idle driving gear
24 Idle driving gear
25 Idle driving gear
26 Idle driving gear
27 Idle driven gear
28 Idle driven gear
29 Idle driven gear
30 Idle driven gear
31 Fixed driven gear
32 Fixed driven gear
33 Fixed driven gear
34 Fixed driven gear
35 Tertiary shaft fixed gear
36 Shift sleeve
37 Shift bar
38 Toothing
39 Toothing
40 Hydraulic cylinder
41 Collar
42 Protrusion
43 Stop device
44 Hydraulic ducts
V1 First speed
V2 Second speed
V3 Third speed
V4 Fourth speed
V5 Fifth speed
V6 Sixth speed
V7 Seventh speed
R Reverse speed
S1 First shift group
S2 Second shift group
S3 Third shift group
S4 Fourth shift group
T Central tunnel

The invention claimed is:

1. A 7-speed transmission for a motor vehicle, comprising a primary shaft, a secondary shaft, first, second third, fourth, fifth, sixth and seventh forward speeds and a reverse speed to establish eight speeds which are combined in pairs into four shift groups, with the speeds of said pairs sharing a common shift device, and with two of the four shift groups being arranged on the primary shaft and the two other of the four shift groups being arranged on the secondary shaft, wherein at least between the first speed and the sixth speed adjacent speeds are arranged in different shift groups, wherein a first shift group comprises the reverse speed and the first speed, a second shift group comprises the second speed and the fourth speed, a third shift group comprises the third speed and the fifth speed, and a fourth shift group comprises the sixth speed and the seven the speed, wherein the first and second shift groups are arranged on the secondary shaft, and the third and fourth shift groups are arranged on the primary shaft.

2. The 7-speed transmission of claim 1 for installation in a sports car.

3. The 7-speed transmission of claim 1, wherein the primary shaft is an input shaft and the secondary shaft is an output shaft.

4. The 7-speed transmission of claim 1, wherein the first and second shift groups are arranged on a half of the secondary shaft which is opposite to a drive engine of the motor vehicle, and the third and fourth shift groups are arranged on a half of the primary shaft which is adjacent to the drive engine.

5. The 7-speed transmission of claim 1, wherein the second shift group is arranged on the secondary shaft on a side of the first shift group adjacent to a drive engine of the motor vehicle.

6. The 7-speed transmission of claim 1, wherein the third shift group is arranged on the primary shaft on a side of the fourth shift group adjacent to a drive engine of the motor vehicle.

7. The 7-speed transmission of claim 1, wherein each of the eight speeds includes a driving gear and a driven gear, of which of the driving gears and the driven gear is arranged on the primary shaft and the other one of the driving gear and the driven gear is arranged on the secondary shaft.

8. The 7-speed transmission of claim 7, wherein the driving gear of the reverse speed and the driving gear of the first speed are mounted in a rotationally restrained manner as fixed gears on the primary shaft, wherein the driven gear of the reverse speed and the driven gear of the first speed are mounted in a rotationally free manner as idle gears on the secondary shaft, and further comprising a shift device operably connected to the first shift group to selectively connect one of the driven gears of the reverse speed and the first speed in a rotationally free manner with the secondary shaft.

9. The 7-speed transmission of claim 7, wherein the driving gear of the second speed and the driving gear of the fourth speed are mounted on a rotationally restrained manner as fixed gears on the primary shaft, wherein the driven gear of the second speed and the driven gear of the fourth speed are mounted in a rotationally free manner as idle gears on the secondary shaft, and further comprising a shift device operably connected to the second shift group to selectively connect one of the driven gears of the second speed and the fourth speed in a rotationally restrained manner with the second shaft.

10. The 7-speed transmission of claim 7, wherein the driven gear of the third speed and the driven gear of the fifth speed are mounted in a rotationally restrained manner as fixed gears on the secondary shaft, wherein the driving gear of the third speed and the driving gear of the fifth speed are mounted in a rotationally free manner as idle gears on the primary shaft, and further comprising a shift device operably connected to the third shift group to selectively connect one of the driving gears of the third speed and the fifth speed in a rotationally restrained manner with the primary shaft.

11. The 7-speed transmission of claim 7, wherein the driven gear of the sixth speed and the driven gear of the seventh speed are mounted in a rotationally restrained manner as fixed gears on the secondary shaft, wherein the driving gear of the sixth speed and the driving gear of the seventh speed are mounted in a rotationally free manner as idle gears on the primary shaft, and further comprising a shift device operably connected to the fourth shift group to selectively connect one of the driving gear of the sixth speed and the seventh speed in a rotationally restrained manner with the primary shaft.

12. The 7-speed transmission of claim 7, wherein the driving gear and the driven gear of the first speed within the first shift group are arranged on a side of the driving and driven gears of the reverse speed which side is opposite to a drive engine of the motor vehicle.

13. The 7-speed transmission of claim 7, wherein the driving gear and the driven gear of the fourth speed within the second shift group are arranged on a side of the driving and driven gears of the second speed which side is opposite to a driven engine of the motor vehicle.

14. The 7-speed transmission of claim 7, wherein the driving gear and the driven gear of the fifth speed within the third shift group are arranged on a side of the driving and driven gears of the third speed which side is opposite to a drive engine of the motor vehicle.

15. The 7-speed transmission of claim 7, wherein the driving gear and the driven gear of the seventh speed within the fourth shift group are arranged on a side of the driving and driven gears of the sixth speed which side is opposite to a drive engine of the motor vehicle.

16. The 7-speed transmission of claim 1, wherein the secondary shaft has a front end which is opposite to a drive engine of a motor vehicle and connected with a drive shaft leading to a front axle differential of the motor vehicle.

17. The 7-speed transmission of claim 1, wherein the primary shaft and the secondary shaft are each supported in three journal bearings.

18. The 7-speed transmission of claim 17, whereon one of the journal bearings is a central journal bearing arranged close to a center of the primary shaft and of the secondary shaft and the other two of the journal bearings are arranged close to two opposite front ends of the primary shaft and of the secondary shaft.

19. The 7-speed transmission of claim 1, further comprising a gearbox comprising two casing parts arranged one behind the other in an axial direction.

20. The 7-speed transmission of claim 18, further comprising a gearbox comprising two casing parts arranged one behind the other in an axial direction, the central journal bearing of the primary shaft and the secondary shaft being arranged close to a dividing plane of the two casing parts.

21. The 7-speed transmission of claim 20, wherein one of the casing parts is placed adjacent to a drive engine, said central journal bearing being arranged in said one casing part.

22. The 7-speed transmission of claim 1, wherein the four shift groups are electro-hydraulically shifted.

23. The 7-speed transmission of claim 1, further comprising four mobile shift bars slidingly moved by hydraulic cylinders within a gearbox in parallel to axes of rotation of the primary shaft and secondary shaft.

24. The 7-speed transmission of claim 23, further comprising a hydraulic group inserted outside the gearbox and connected with the hydraulic cylinders through hydraulic ducts.

* * * * *